(12) United States Patent
Rault et al.

(10) Patent No.: US 8,239,466 B2
(45) Date of Patent: Aug. 7, 2012

(54) LOCAL LOOP FOR MOBILE PEER TO PEER MESSAGING

(75) Inventors: Severan Rault, Kirkland, WA (US); Lawrence Ripsher, Seattle, WA (US); David Abzarian, Kirkland, WA (US); Todd L Carpenter, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 266 days.

(21) Appl. No.: 12/484,844

(22) Filed: Jun. 15, 2009

(65) Prior Publication Data
US 2010/0318617 A1    Dec. 16, 2010

(51) Int. Cl.
*G06F 15/16* (2006.01)
(52) U.S. Cl. ........ 709/206; 709/232; 709/238; 709/241; 348/14.1
(58) Field of Classification Search .................. 709/206, 709/238, 232, 241; 348/14.1
See application file for complete search history.

(56) References Cited

U.S. PATENT DOCUMENTS

| | | | |
|---|---|---|---|
| 6,981,052 B1 * | 12/2005 | Cheriton ..................... | 709/232 |
| 7,120,455 B1 | 10/2006 | Chen et al. | |
| 7,756,979 B1 * | 7/2010 | Staack et al. .................. | 709/227 |
| 2003/0131061 A1 * | 7/2003 | Newton et al. ................ | 709/206 |
| 2006/0036689 A1 * | 2/2006 | Buford et al. ................. | 709/206 |
| 2006/0168037 A1 | 7/2006 | Audu et al. | |
| 2006/0264204 A1 | 11/2006 | Livingood | |
| 2007/0022160 A1 | 1/2007 | Dauguet et al. | |
| 2007/0124386 A1 | 5/2007 | Klassen | |
| 2007/0263066 A1 * | 11/2007 | Henning et al. ........... | 348/14.01 |
| 2008/0141048 A1 * | 6/2008 | Palmer et al. ................. | 713/300 |

OTHER PUBLICATIONS

Greene, et al., "Instant Messaging & Presence Management in Mobile Ad-Hoc Networks", retrieved on Apr. 30, 2009 at <<https://www.cs.tcd.ie/~omahony/MP2P_01_Greene_D.pdf>>, Network and Telecommunications Research Group, Department of Computer Science, Trinity College, Ireland. 5 pages.
Kato, et al., "A Platform and Applications for Mobile Peer-to-Peer Communications", retrieved on Apr. 30, 2009 at <<http://www.research.att.com/~rjana/Takeshi_Kato.pdf>>, 5 pages.
Parviainen, et al., "Mobile Instant Messaging", retrieved on Apr. 30, 2009 at <<http://media.csee.ltu.se/publications/2003/mim.pdf>>, IEEE 2003, 6 pages.
"Preference-rank translation", retrieved on Apr. 30, 2009 at <<http://en.wikipedia.org/wiki/Preference-rank_translation>>, Wikipedia, Dec. 21, 2007, 1 page.
Saint-Andre, "Best Practices for Handling Offline Messages", retrieved on May 1, 2009 at <<http://xmpp.org/extensions/xep-0160.html>>, XMPP Standards Foundation, Jan. 24, 2006, 6 pages.
Ueda, et al., "Implementing Messaging Services on Ad Hoc Community Networks using Proxy Nodes", retrieved on Apr. 30, 2009 at <<http://www.iimcal.ac.in/research/adhocnet/Papers/15.pdf>>, 5 pages.

* cited by examiner

*Primary Examiner* — Ario Etienne
*Assistant Examiner* — Michael C Lai
(74) *Attorney, Agent, or Firm* — Lee & Hayes, PLLC

(57) ABSTRACT

Techniques described herein describe a proxy used in an instant messaging system. The proxy, upon receiving an instant message (IM) from a first mobile device and addressed to a second mobile device, dynamically determines whether, and for how long to store the IM on a local proxy. Otherwise the IM is forwarded to a server.

19 Claims, 6 Drawing Sheets

LOCAL LOOP FOR MOBILE PEER TO PEER MESSAGING

BACKGROUND

Mobile phone users (and users of other devices) often send instant messages (IM) to other mobile phone users. In order to send an IM, a mobile phone user can simply type and send the IM to a mobile phone number of another user. This IM is then usually routed to an IM backend, such as a central server, where it is then sent to the other mobile phone. However, routing of the IM messages between multiple mobile phones can present various challenges.

SUMMARY

Techniques described herein describe systems and methods for using a local proxy in an instant messaging system. An instant message (IM) can be sent from a device of a first mobile user (first device) to a device of a second mobile user (second device). The IM may be propagated to a local proxy, which may decide whether to locally store the IM or to forward it to a server. The local proxy may apply a dynamic weighting scheme to decide whether to store the IM and for how long. The second device may request the IM, at which point it could be sent to the second device from the local storage. Otherwise the IM may be forwarded to another server in the network This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying FIGs. In the FIGs, the left-most digit(s) of a reference number identifies the FIG. in which the reference number first appears. The use of the same reference numbers in different FIGs indicates similar or identical items.

Figure 1:
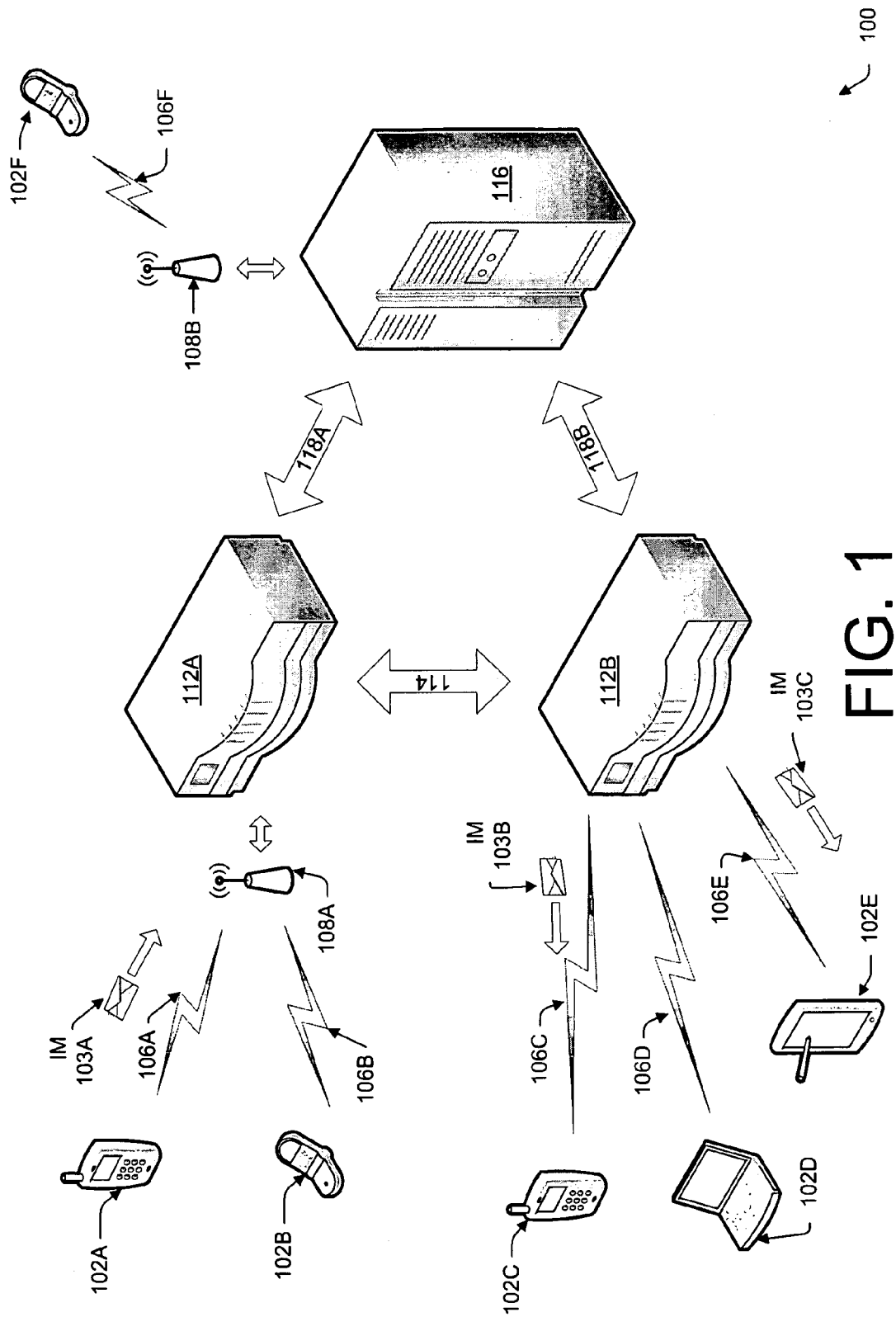
FIG. 1 shows an illustrative diagram of an instant messaging system, according to certain embodiments.

While the invention may be modified, specific embodiments are shown and explained by way of illustration in the drawings. The drawings and detailed description are not intended to limit the invention to the particular form disclosed, and instead the intent is to cover all modifications, equivalents, and alternatives falling within the spirit and scope of the present invention as defined by the claims.

DETAILED DESCRIPTION

This document describes systems and methods for using a local proxy in an instant messaging system. An instant message (IM) can be sent from a first mobile device to a second mobile device. The IM may be propagated to a local proxy, which may decide whether to locally store the IM for local delivery or to forward it to a central server for subsequent delivery. The local proxy may apply dynamic weighting scheme to decide whether, and for how long, to store the IM. The second device may request the IM, at which point it could be sent to the second device from the local storage.

More specifically, a local proxy may use a local message cache (also referred to as a local loop) to temporarily store messages, such as instant messages, if the two peer devices are determined to be local to the local proxy. The determination may be made by the local proxy and on the basis of a caching policy of the local proxy. If the temporary destination device is available to receive or retrieve the message, the message is transmitted directly to the destination peer without forwarding the message to the central server (also referred to as the IM backend). As a result, by using the local proxy, the central server can store and/or queue less instant messages (IMs), delays between sending and receiving the IMs may be minimized, and the reliability of network connections between the devices may be improved.

Furthermore, because the local proxy may reduce network utilization, the local proxy may reduce user and/or network provider costs. For instance, some network providers rent some physical links from other network providers. In these situations and others, the local proxy may therefore reduce the network provider's rental costs.

FIG. 1

FIG. 1 is an illustrative block diagram illustrating various components of a system for facilitating instant messaging between two or more devices. Each of the two or more devices (i.e., two peers) may be a mobile phone, a smart phone, a computer (e.g., a laptop, desktop, table computer), a portable or home video-game console, and/or any other device capable of receiving and/or sending instant messages (IMs), including interactive TVs and/or integrated auto navigation and/or entertainment systems. An instant message may be as simple as a text "Hello," although it can also be one or more of a hyperlink, a list, and/or a file, among other more complex instances. The instant messaging system may be used with other type(s) of communication system(s), such as audio and/or video (e.g., in videoconferencing applications) communication systems.

Although the description enclosed herein is directed to using a proxy for facilitating instant messaging between two or more devices, it is possible to use the method(s) described herein for other uses, such as for facilitating communication of text messages, audio/voice messages (such as walkie-talkie applications), and/or video messages, among others. The discussion herein describes sending, receiving, and/or storing of IMs. However, this discussion also applies to sending, receiving, and/or storing of text messages, as well as other forms of communication.

FIG. 1 shows the two or more devices 102A-F that may send IMs between each other. More specifically, a first user (not shown) may operate the first device 102A to send the IM to a second user (not shown) operating the second device 102B. Where this specification states that a "device sends an IM," it is implied that a user of the device is using the device to type and/or send the IM. In some embodiments, though, the devices 102A-F send IMs in autonomous manners. However, for the sake of simplicity, the users of the devices 102A-F are not shown in these FIGs.

With continuing reference to FIG. 1, any device 102 may communicate with any other device or combinations thereof. For instance, a first device 102A (a source peer) may send an IM 103A to a second device 102B (a destination peer). Similarly, the second device 102B may send another IM 103B to a third device 102C. The third device 102C may send an IM to each of a fourth device 102D and to a fifth device 102E, respectively. The fourth device 102D may send an IM 103C to the fifth device 102E. Furthermore, the first device may send an IM to a sixth device 102F. Thus, the devices 102A-F can communicate with each other according to a large number of permutations.

The devices 102A-F may be communicatively coupled to a network using connections 106A-F. Each of the connections 106A-F may be a wireless connection, such as used by mobile phones, including one or more of any Global System for Mobile Communications (GSM) network, any Time Division Multiple Access (TDMA) network, any CDMA (Code Division Multiple Access) network, among others. Thus, in some embodiments, the first device 102A on a GSM network may send the IM to the sixth device 102F on one of the CDMA networks (such as CDMA2000, EVDO, UMTS, or IS-95) among other variations.

Each of the connections 106A-F may also be a wired or an Internet connection. The internet connection may be any type of a wired or wireless connection. The fourth device 102D may be a laptop computer 102E, and it may send an IM to another computer 102E, using a local area network (LAN), a wide-area network (WAN), Internet, and/or other communication network. The fifth device 102E on a GSM network may send the IM to the sixth device 102F on one of the CDMA networks. The third device 102C on the Internet can send an IM to a second device 102B on a cell phone network (e.g., a GSM network).

The connections 106A-F may thus communicatively couple the devices 102A-F to access points and/or routers 108A-B (referred to as access points herein). The connections 106A-F may thus facilitate communication of the respective IMs between the devices 102A-F and the access points 108A-B.

Each of the access points 108A-B may be a wireless access point, and may be communicatively coupled to a local proxy 112A or 112B and a central server 116 (also referred to as the IM backend), respectively. Operation of the local proxy 112A/B is described with more specificity below. The local proxies 112A/B may be communicatively coupled together via a proxy communication link 114. The local proxy 112A/B is communicatively coupled, respectively, to the central server 116 via communications links 118A/B. Furthermore, the access point 108B may communicate with the central server 116 directly, i.e., without using a local proxy.

The central server 116 (or servers in networks which use a topology including multiple servers or hierarchies of servers) can function as a communications backbone (e.g., an IM backbone) for instant messaging services. Thus, the central server 116 may receive and store the IMs from all of the devices 102A-F, as well as send the IMs to the recipient device(s) 102A-F. However, when operating in large geographical areas, or in small geographical areas with a large number of users (and hence a large number of devices), the local proxy 112A/B may locally process and/or store a portion of the IMs being sent between the devices 102A-F for local routing, delivery, retrieval, etc. Moreover, the local proxy 112A/B may locally process and/or store some or all of the IMS for other reasons. As a result, less IMs are sent to the central server 116 for processing, thus saving network bandwidth, cost (for instance, if a portion of the network is rented), and/or processing usage of the central server 116. In the alternative, or in addition, the local proxy 112A/B may route the IMs to the central server 116 (or a next server in the network) for further storage, routing, delivery, retrieval, etc.

Thus, the local proxy 112A/B (or the central server 116) may push the IMs to the devices 102A-F when the device makes a connection to the local proxy 112A/B for some reason (for instance, checking email, updating the devices' time, other data exchange, etc.). The devices 102A/F may poll or otherwise retrieve the IMs when the devices 102A/F communicate with the local proxy 112A/B. The network as used herein may include the network between the devices 102A-F and the proxies 112A/B, between the devices 112A-F and the central server 116 (as applicable), and/or between the proxies 112A/B and the central server 116.

In some situations the various devices 102A/F (being mobile or otherwise intermittently in communication with portions of networks such as that shown in FIG. 1) communicate with the network and in some situations the devices 102A/F do not. For instance, some devices 102A might roam away from a particular network and be in communication with the network only indirectly.

Other devices 102B might physically (or logically) move such that at times the particular device 102B communicates directly with one portion of the network and may use that portion as a means for communicating indirectly with other portions of the network. At times the particular device 102B might communicate directly with another portion of the network. Still, at other times, the particular device 102B might communicate directly with more than one portion of the network (for instance between so called station hand-offs). Then, again, at times the particular device 102 might be out of communication with all portions of the network or disabled (for instance being turned off or in "airplane mode"). Thus, from time-to-time the devices 102 establish communication with (or connect to) one of the local proxies 112A/B for the purposes of exchanging data (such as the IMs).

One result of this multiplicity of disparate methods for the particular device 102A to communicate with portions of the network is that communications to/from the particular device 102A may take a number of paths from/to the device 102A and another device 102B which participants in the particular communication. Indeed, one IM addressed to several devices 102A-F may be processed in manners that are potentially unique to each device 102A-F. In one such scenario, for instance, devices 102A and 102B are connected to local proxies 112A and 112B respectively. Devices 102C, 102D, 102E, and 102F are disconnected or otherwise unavailable.

In this scenario if device 102A transmits a message addressed to the other devices 102B-F, the system 100 will route an instance of that IM to local proxy 112B for delivery to device 102B. The system 100 will also instantiate the IM for each of the unavailable devices 102B-F and hold them in local storage in an appropriate local proxy 112A/B (such as the particular local proxy 112A which first processed the IM). When the unavailable devices 102B-F become available (i.e., they connect to the system 100), the appropriate instances of the IM will be delivered as explained further herein.

FIG. 2A

Figure 2A:
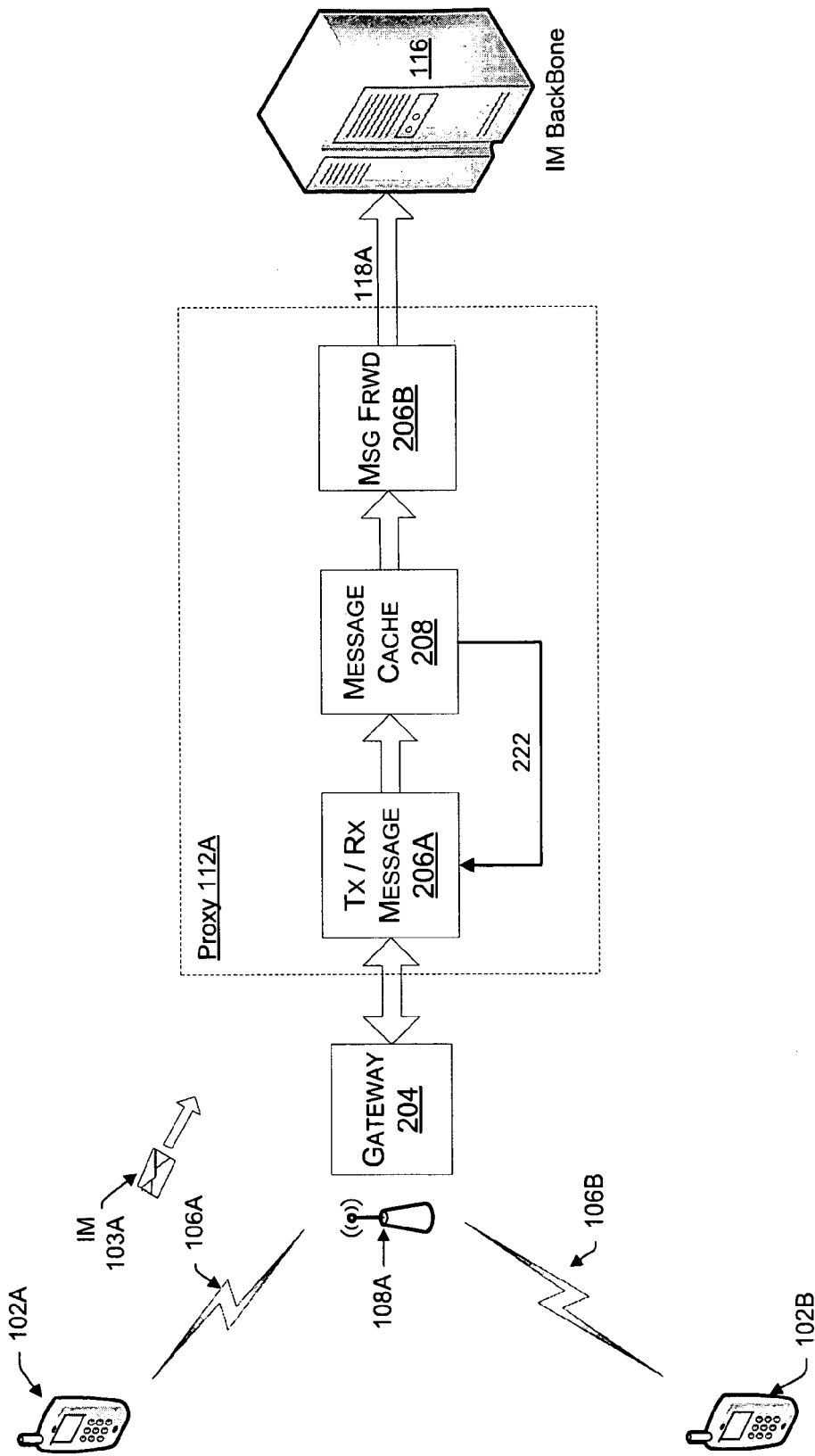
FIG. 2A shows an illustrative diagram of an instant messaging system with an illustrative diagram of local proxy, according to certain embodiments.

FIG. 2A is a more detailed illustrative block diagram illustrating various components of a system for facilitating instant messaging between two or more devices whether mobile or not.

As described above, the first device 102A may send an IM 103A to the second device 102B. The IM 103A may be propagated from the first device 102A via the communication link 106A to the access point 108A. The access point 108A may then propagate the IM 103A to the proxy 112A. In some embodiments, the access point 108A may first propagate the IM 103A to a gateway 204. The gateway 204 may facilitate access to the proxy 112A. In some embodiments, the gateway 204 may be a part of the proxy 112A, although it can also be a physically separate device.

The IM 103A may be propagated to a send/receive module 206A in the proxy 112A. The send/receive module 206A may process the IM 103A, including, but not limited to, determining an address for the first and the second device 102A/B. The send/receive module 206A may propagate the IM 103A to a message cache module 208. The message cache module 208 may determine whether to store the IM 103A or to propagate the IM 103A to the message forwarding module 206B. The message cache module 208 may store the IM 103A for later retrieval.

If the IM 103A is propagated to the message forwarding module 206B, the message forwarding module 206B may then forward (via the communication link 118A) the IM 103A to the central server 116 for storage. However, if the second device 102B requests the IM 103A, then the message cache module 208 may retrieve and send the IM 103A back to the send/receive module 206A via a local loop 222, where the IM 103A may be sent to the second device 102B. Hence the origin of the non-limiting name "local loop" for this system for locally processing and storing the IM 103A; i.e., the IM 103A may be locally looped in the local proxy 112A without using the central server 116.

FIG. 2B

Figure 2B:
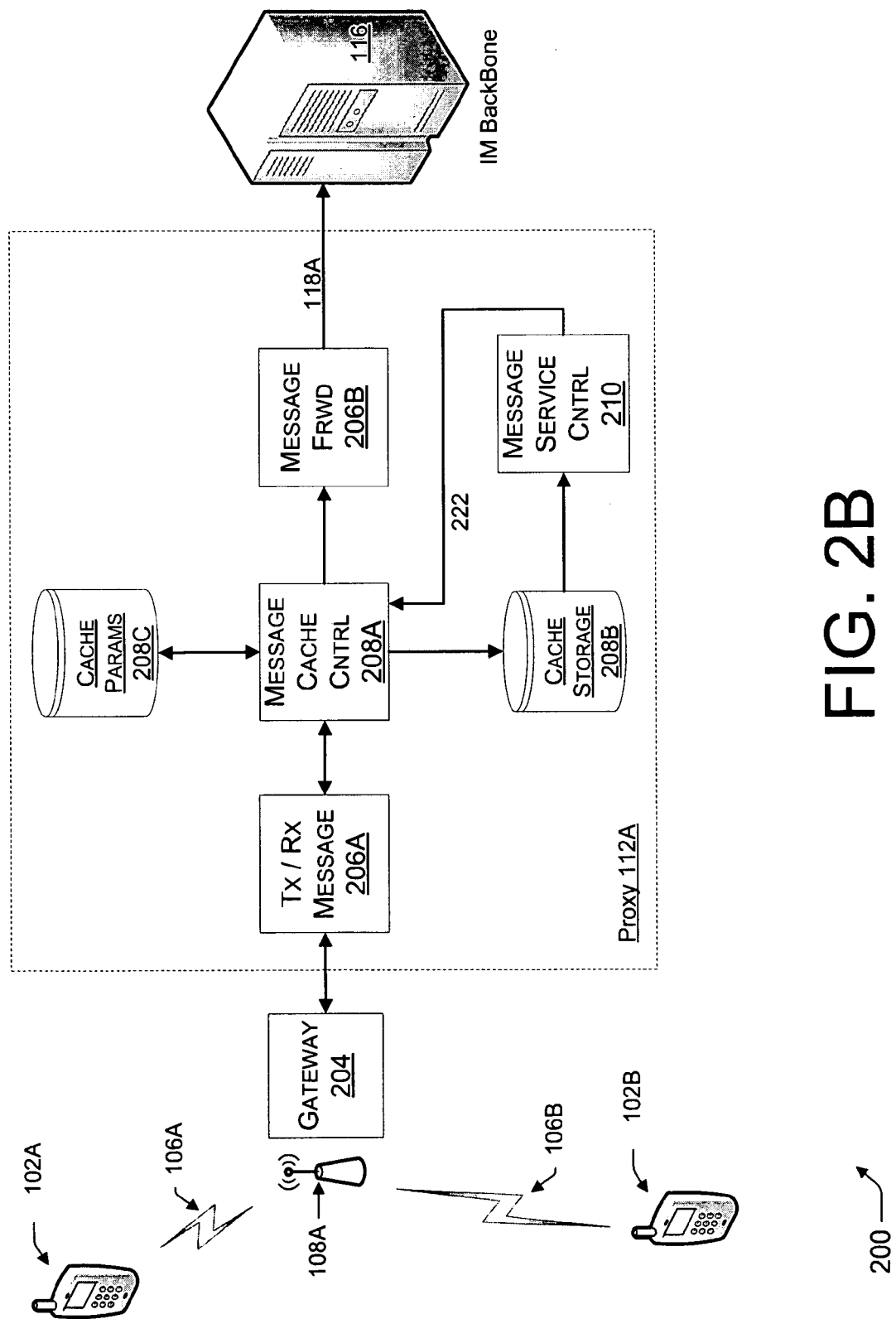
FIG. 2B shows another illustrative diagram of an instant messaging system with an illustrative diagram of local proxy, according to certain embodiments.

FIG. 2B shows another illustrative block diagram illustrating various components of a system for facilitating instant messaging between two or more devices.

As described above, a first device 102A may send an IM 103A to the second device 102B. The IM 103A may be propagated from the first device 102A via the communication link 106A to an access point 108A. The access point 108A may then propagate the IM 103A to the proxy 112A. In some embodiments, the access point 108A may first propagate the IM 103A to a gateway 204. The gateway 204 may facilitate access to the proxy 112A, and more specifically to the send/receive module 206A.

In FIG. 2B, the message cache module 208 of FIG. 2A is divided into a message cache controller 208A, a message cache 208B, and a parameter storage 208C. However, this is an illustrative configuration only, and other implementations may easily use one, two, four, five, or more distinct modules. It is also noted that local proxy 112A includes a "local loop," for reasons similar to those described above.

In some instances, the second device 102B may be ready to receive and/or may request to receive the IM 103A from the proxy 102A before it is stored in the message cache 208B. In these instances, the proxy 112A may send the IM 103A to the second device 102B without storing the IM 103A and/or before forwarding (via the communication link 118A) the IM 103A to the central server 116. More specifically, the send/receive module 206A may send the IM 103A to the second device 102B before the proxy 112A stores the IM 103A and/or before the IM 103A is forwarded to the central server 116.

The message cache controller 208A may first determine whether the second device 112B is local to the proxy 112A. The second device 102B may be determined to be local to the proxy 112A if both the first and the second device 102A/B are on a same sub-network as that particular local proxy 112A, or if both the first and the second device 102A/B can be accessed using the access point (e.g., access point 108A) of that particular local proxy 112A. If the message cache controller 208A determines that the second device 102B is local to the proxy 112A, then it may store the IM 103A from the first device 102A for the second device 102B in a local cache 208B of the proxy 112A.

Furthermore, the message cache controller 208A may record any parameters associated with the IM 103A communications from the first device 102A to the second device 102B in the cache parameter storage 208C. The cache parameter storage 208C may be used to keep track of parameters for the devices 102A-F, such as the total number of communications (instant messages and other types of communications), the total number of IMs sent by each device 102A-F, the total number of IMs received by each device 102A-F, correlations between IMs sent between devices, the last time each device 102A-F sent any communication, the last time each device 102A-F sent an IM 103A, parameters related to network congestion, the number of any dropped IMs from each device 102A-F and/or the central server 116, among other illustrative parameters.

However, the message cache controller 208A may direct the message cache 208B to store the IM 103A instead of propagating the IM 103A to the message forwarding module 206B. If the IM 103A is stored, it may be propagated (via the local loop 222) to the message forwarding module 206B (either via the message cache control 208A or directly) at a later time, such as if the second device 102B never requests the IM 103A, and/or if the second device 102B is unavailable to receive the IM 103A. The message cache 208B may store the IM 103A and the IM 103A may be sent (using the local loop 222) to the second device 102B before the IM is deleted and/or forwarded (via the communication link 118A) to the central server.

Thus, once the IM 103A is stored in the message cache 208B, a message service controller 210 may read the IM 103A from the message cache 208B and propagate the IM 103A to the message cache controller 208A. The message service controller 210 may read the IM 103A upon an event, such as a timeout and/or a request from the second device 102B. Upon receiving the IM 103A from the message service controller 210, the message cache controller 208A may either send (via the local loop 222) the IM 103A to the second device 102B or forward (via the communication link 118A) the IM 103A to the central server 116 via the message forward module 206B.

The message cache controller 208A may then determine for how long the IM 103A may be stored. However, in some embodiments, the technique described below may be used prior to actually storing the IM 103A. The message cache controller 208A may apply a weighting scheme to determine if the IM 103A for the second device 102B should be stored. More specifically, the weighting scheme may be used to determine a dynamic weight, which may be compared to a pre-determined threshold value. In the alternative, or in addition, the threshold value can be determined dynamically based on changed conditions and/or a relationship between the dynamic weight and the threshold value may be determined. The message cache controller 208A may store the IM 103A in the message cache 208B of the proxy 112A if the dynamic weight for the second device 102B exceeds and/or meets the pre-determined threshold value.

The message cache controller 208A may use one or more of the following weighting criteria when calculating the dynamic weight using the weighting scheme:

a number of times the second device 102B has recently connected to the proxy 112A for transmission or receipt of other IMs;

the amount of time elapsed since the second device 102B has connected to the proxy 112A for transmission or receipt of other IMs;

a number of times the second device 102B has connected to the proxy 112B for transmission or receipt of other IMs over a pre-determined amount of time, such as over a lifetime of usage for the second device 102B;

whether the first device 102A and the second device 102B are on a list of preferred connections on either device, such as whether the first device 102A has a preferred list of connections that includes the second device 102B;

conditions of a network connecting one or more of the first device 102A, the second device 102B, the proxy 112A, and the central server 116; the network conditions may include available network bandwidth between the proxy 112A and the central server 116, amount of IMs and/or other data packets dropped, missed, and/or re-transmitted between the proxy 112A and the central server 116, and other devices and/or proxies;

whether the message cache 208B is getting full; or the used or remaining storage capacity of the message cache 208B.

Therefore, the message cache controller 208A may use the weighing scheme to maximize efficiency of the local message cache 208B for the local proxy 112A. In some embodiments, the weighting scheme may prioritize the caching of IMs destined for devices 102A-F that have recently sent or received IMs from the local proxy 112A.

Furthermore, the message cache controller 208A may determine a timeout value for a duration of storing the IM 103A in the storage of the proxy (i.e., in the message cache 208B). The timeout value may be based on a number of times the second device 102B has previously connected to the proxy 112A to receive and/or transmit other IMs. In other words, the message cache 208B may store the IM 103A for a pre-determined amount of time.

In some embodiments, the weighting scheme may use a timeout system, where the message cache controller 208A keeps track of how long the IM 103A is stored in the local cache storage 208B without the IM 103A being successfully transmitted to its destination (i.e., the second device 102B). Thus, if the IM 103A is stored for a greater (or greater or equal to) amount of time than a pre-determined timeout, then the IM 103A is sent (via the communication link 118A) to the central server 116.

In some embodiments, the message cache controller 208A may combine the above two techniques to use a dynamic weighting scheme. Therefore, timeout values can be dynamically calculated based on weighting assigned to each of the devices 102A-F. Devices 102A-F that have been more active on the local proxy 112A may be provided additional time to retrieve their respective IM 103A to optimize network bandwidth (e.g., the bandwidth between the local proxy 112A and the central server 116).

In some embodiments, the techniques used by the proxy 112A in determining whether and for how long to store the IMs may be adjusted by one or more of the central server 116 and/or a system 200 administrator. Thus, these techniques may be set to use timeout only, frequency of previous connections, the dynamic weighting scheme, and/or other weighting schemes. In some embodiments, these techniques and/or the weighting schemes may be dynamically adjusted based on the network conditions (e.g., as described with reference to the weighting criteria). Therefore the behavior of the local proxy 112A may be adjusted based on the application, such as whether a network using the system 200 is used in an urban or rural setting, an industrialized or a developing country, on the number of access points 108A-B, gateways 204, proxies 112A/B, and central server(s) 116, the number of local devices 102A-F, as well as on the characteristics of the network itself. Moreover, the system administrator can set a policy(s) to manage timeouts and other aspects of the weighting scheme or otherwise override certain affects of the weighting scheme.

Additionally, it is contemplated that a first proxy 112A and a second proxy 112B (see FIG. 1) can be communicatively coupled (via a proxy communication link 114) together to form a larger proxy that can behave as one proxy (e.g., as the first proxy 112A discussed herein). Thus, the third device 102C (see FIG. 1) can send an IM to the first device 102A utilizing the advantages of a "local loop" as described herein. In other words, the IM from the third device 102C to the second device 102B can be processed and/or stored using the combined local proxy 112A/B without using the central server 116.

In some embodiments, the message cache controller 208A may temporarily store each IM 103A message in the local message cache 208B. The message cache controller 208A may use a weighting scheme that dynamically adjusts to the number of times a device 102A-F has connected for transmission or receive purposes, as well as the time since the last connection. The message cache controller 208A may thus modify a timeout value based on the dynamic weighting scheme to improve network efficiency.

The weighting scheme may use various other weighting criteria (such as network bandwidth) to generate the dynamic weight. In some embodiments, the percentages of allocations to the dynamic weight may be dynamically changed as well, such as in response to other weighting criteria. Thus, if the available network bandwidth (e.g., the bandwidth between the local proxy 112A and the local server 116) is low, then the elapsed time may be accounted for a larger percentage of the dynamic weight.

In the following illustration, the dynamic weight may be dynamically adjusted to reflect the network conditions, i.e., the dynamic weight may be changed based on various weighting criteria in response to varying conditions within or affecting the system. An exemplary weighting scheme calculation that uses just two of the possible weighting criteria (the elapsed time since the IM 103A was stored in the local cache 208B and activity of the second device 102A/B) is described below.

| Device | Time Elapsed Since Last Connection | Life Time Connections | Dynamic Weight |
|---|---|---|---|
| 2$^{nd}$ Device 102B | 500 seconds | 1000 | 200 |
| 3$^{rd}$ Device 102C | 3500 seconds | 5000 | 143 |
| 4$^{th}$ Device 102D | 2000 seconds | 2000 | 100 |
| 5$^{th}$ Device 102E | 6000 seconds | 12000 | 200 |

The illustration above shows an illustrative weighting table, that uses an illustrative formula to calculate the dynamic weight:

$$\text{Dynamic Weight} = 100 * \left( WLC * LC \frac{LC}{WTE} * TE \right)$$

Where LC is the number of lifetime connections, WLC is a weight associated with the number of lifetime connections, TE is the time elapsed since the last connection, and WTE is a weight associated with the time elapsed since the last connection.

Utilizing this weighting scheme the message cache controller 208A may use a weighting threshold of 200, meaning that if a device 102A-F has a dynamic weight equal to or greater than 200, then the cache controller 208A would direct the local message cache 208B to prioritize caching for that device. Applying this illustrative weighting scheme to the above, any messages (e.g., IMs) for the second device 102B and for the fifth device 102E would be kept on the local storage 208B because their respective dynamic weights equal or exceed 200. Furthermore, the message cache controller 208A may instruct the local cache 208B to delete and/or not store any additional IMs for the third and fourth devices 102C/D because their respective dynamic weights fail to equal or exceed 200. Furthermore, a timeout may be generated that is proportional to the dynamic weight. Thus, a large dynamic weight may yield a longer timeout value for the respective device.

Figure 3A:
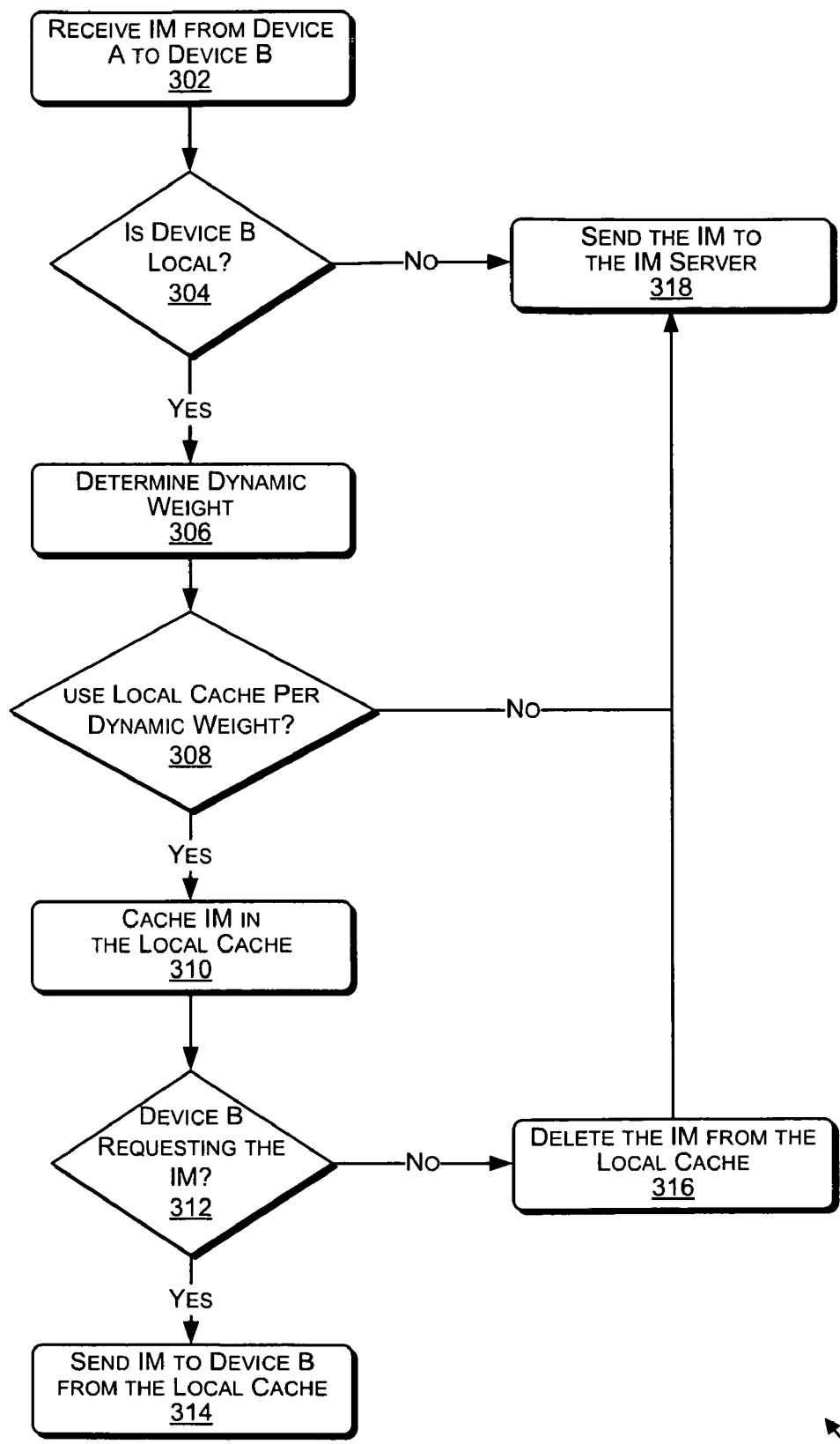
FIG. 3A shows an illustrative method for using a local proxy in an instant messaging system, according to certain embodiments.
Figure 3B:
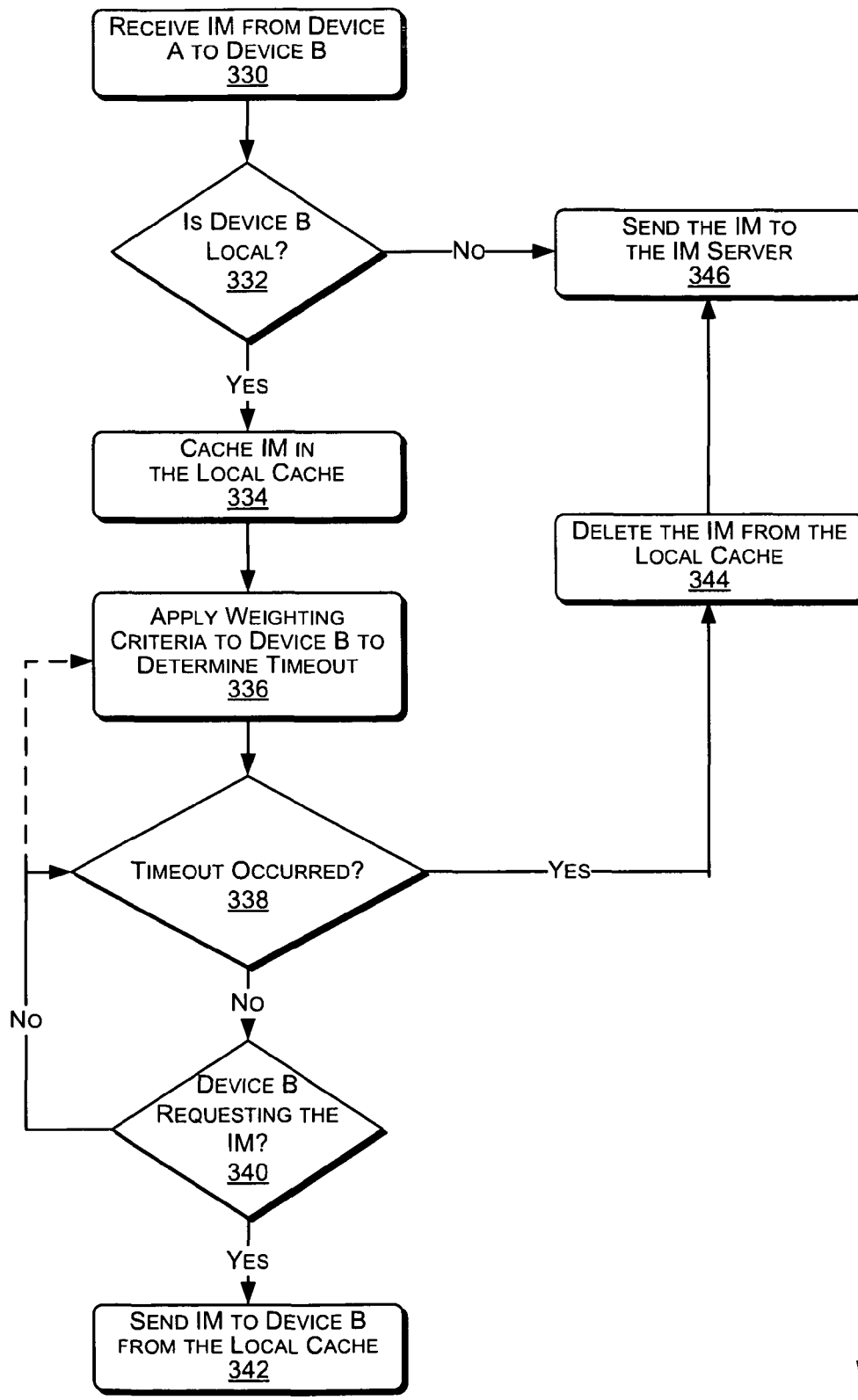
FIG. 3B show an illustrative method for using a local proxy in an instant messaging system, according to certain embodiments.

FIGS. 3A and 3B

FIGS. 3A and 3B depict an illustrative flow diagram of a method 300 for using a local proxy 112A to facilitate instant messaging between two or more devices 102A-F.

Although the description enclosed herein is directed to instant messaging, it is possible to use the method(s) described herein for other uses, such as for texting, video messaging, voice messaging, video conferencing, and/or emailing, among others. As described herein, the method 300 may be implemented on a computer system, such as on a local proxy 112A As described below, certain portions of the blocks of FIGS. 3A and 3B may occur on-line or off-line. More specifically, certain blocks or portions of the blocks may be performed off-line in order to save processing time and/or speed-up the response of the on-line portions. It is also understood that certain acts need not be performed in the order described, and may be modified, and/or may be omitted entirely, depending on the circumstances.

FIG. 3A

In FIG. 3A, in block 302, according to certain embodiments, the method 300 receives an instant message (IM) from a first device 102A (i.e., device A in FIG. 3A). However, as mentioned above, the method may use a text, audio, and/or video message instead, or in addition to, the IM 103A. More specifically, the local proxy 112A and/or the home gateway 204 may receive the IM 103A, such as by using an access point 108A and/or any other mechanism for receiving data messages over a network.

In block 304, the method may determine whether the second device 102B (i.e., device B in FIG. 3A) is local to the local proxy 112A. In some embodiments, the second device 102B may be determined to be local to the proxy 112A if it is on a same sub-network as the local proxy 112A, or if it can be accessed using that particular access point (e.g., access point 108A) of the local proxy 112A. In some embodiments, the second device 102B may be determined to be local to the proxy 112A if both the first and the second device 102A/B are on a same sub-network as that particular local proxy 112A, or if both the first and the second device 102A/B can be accessed using the access point (e.g., access point 108A) of that particular local proxy 112A.

Block 304 can include determining whether a particular device 102A is likely to connect to a local proxy 112A. More particularly, the central server 116 (or the local proxies 112A/B) can monitor the activity of the particular device 102A for patterns of device 102A activity. For instance, it may be the case that the user of the device 102A typically makes a connection to local proxy 112A at some time (or times) such as 8-9 a.m. and 5-10 p.m. on weekdays. If the particular local proxy 112A receives an IM addressed to the device 102A during one of these times (and/or shortly before), it can attempt to deliver the IM at about the time it is received.

In the alternative, or in addition, the particular local proxy 112A can store the IM in its local message cache 208. On the other hand, if an IM addressed to device 102A arrives at the local proxy 112A at some other time (and/or shortly after those times that the device 102A is likely to connect)), the local proxy 112A can forward the IM to the central server 116 for subsequent delivery. The subsequent delivery may occur through another local proxy 112B which the device 102A is likely (and/or most likely) to connect to next (or soon). These patterns can be stored in the memory of the local proxies' 112A/B and/or the memory of the central server 116 and consulted on an as-desired basis.

Thus, in the foregoing scenario, if the local proxy 112A receives an IM addressed to device 102A at 8:15 a.m. on Tuesday, the local proxy 112A can attempt to deliver that IM or perhaps hold it in the local message cache 208. On the other hand, if the local proxy 112A receives an IM addressed to device 102A at 9:15 a.m., it can forward the IM to the central server 116 for subsequent delivery when the device 102A connects to the system through another local proxy 112B or even through the particular local proxy 112A involved in receiving the IM. Pattern recognition techniques therefore allow the system 200 to conserve resources (such as bandwidth, power, etc.) while also expediting delivery of IMs to the devices 102A-F.

In block 306, the method 300 may apply a weighting scheme to device B to determine the dynamic weight for the IM 103A addressed to the second device 102B, and thus whether to store the received IM 103A. The weighting scheme may account for a number of times the second device 102B has connected to the local proxy 112A for message retrieval or transmission, as well as the elapsed time since the second device's 102B last connection to the local proxy 112A. These weighting criteria may be combined to generate a dynamic weight, such as by allocating 50% of the dynamic weight value from the elapsed time and 50% of the dynamic weight from the number of connections. It is noted that these percentages are for illustrative purposes only.

In block 308, the method 300 may use the dynamic weight calculated above to decide whether to store the IM 103A in the local cache 208B.

In block 310, the method may store the IM 103A in the local cache 208B depending on a relationship between the dynamic weight and a pre-determined threshold. The method may store the IM 103A in the local cache 208B if the dynamic weight is equal to or greater than a pre-determined threshold. However, in some embodiments, the method 300 may automatically store the IM 103A, and then dynamically determine the duration of the timeout, i.e., for how long to store the IM 103A in the local cache 208B (see FIG. 3B).

In block 312, the method 300 may determine whether the second device 102B is requesting the IM 103A. In some embodiments, block 314 may determine whether the second device 102B requests the IM 103A within the calculated timeout value.

In block 314, if the second device 102B requests the IM 103A (such as within the specified timeout value), the method may send the IM 103A to the second device 102B. In other words, the IM 103A may be sent from the local message cache 208B to the second device 102B, without forwarding 318 the IM 103A to the central server 116. Furthermore, the IM 103A may be deleted from the local cache 208B. This activity may be recorded by the local cache controller 208A in the parameter storage 208C, which may be used in subsequent dynamic weight calculations.

In block 316, if the second device 102B does not request the IM 103A (such as within the specified timeout value), the method may delete the IM 103A from the local message cache 208B. However, the IM 103A may be forwarded 318 to the central server 116 for processing. In other words, the IM 103A being deleted from the local proxy 112A will instead be processed by the central server 116.

FIG. 3B

FIG. 3B illustrates an alternate method 300 of using the local proxy 112A. This alternate method may operate similarly to the method shown in FIG. 3A, but some similar steps in these methods are executed in a different order. It is noted that variations of the method(s) shown in FIGS. 3A and 3B may be easily used, such as by first determining a first dynamic weight to determine whether to store the IM 103A (see 306/336) and then determining a second dynamic weight to determine the timeout. The first and the second dynamic weights above may be the same, and/or may use a similar calculation, or they may use different calculation(s) to generate each dynamic weight.

In block 330, according to certain embodiments, the method 300 may receive an instant message (IM 103A) from a first device 102A (a source peer) addressed to a second device 102B (a destination peer).

In block 332, the method may determine whether the second device is local to the local proxy 112A.

In block 334, the method may store the IM 103A in the message cache 208B if the second device is local to the local proxy 112A.

In block 336, the method 300 may apply a weighting scheme to the second device 102B to determine a timeout value. This may involve calculating a dynamic weight, and using the dynamic weight to calculate a timeout value for each device that is proportional to the dynamic weight.

In block 338, the method 300 may determine whether an actual timeout occurred. The dynamic weight calculated above may be used to determine a timeout value for the IM 103A for the second device 102B. The method 300 may compare the actual elapsed time during which the IM 103A for the second device was stored to the timeout value (which can also be dynamically determined as described herein). If the IM 103A was stored for an amount of time greater than the timeout value, then the local proxy may delete the IM 103A from the local cache 208B and send (via the communication link 118A) the IM 103A to the central server. If the IM 103A was stored for an amount of time equal to or less than the timeout value, then the local proxy 112A may keep storing the IM 103A in the local message cache 208B.

In block 340, the method may determine whether the second device 102B is requesting the IM 103A. If the second device 102B is not requesting the IM 103A, then the method 300 may go back and determine if a timeout occurred 338. Optionally, the method 300 may also re-calculate the timeout value per block 336, e.g., as the weighting criteria used to calculate the dynamic weight (and thus the timeout itself) may have changed. In other words, if during a temporary storage time, the destination peer (the second device 102B) is available to receive the IM 103A, the IM 103A is transmitted directly to the destination peer without forwarding the message to the central server 116.

In block 342, if the second device 102B requests the IM 103A (such as within the specified timeout value), the method may send the IM 103A to the second device 102B. Furthermore, the IM 103A may be deleted from the local message cache 208B.

In block 344, if a timeout occurred as determined via block 308, the method may delete the IM 103A from the local cache in step 344, and the IM 103A may be forwarded to the central server 116 for processing in step 346. In other words, the IM 103A is deleted from the local proxy 112A and is instead processed by the central server 116.

FIG. 4

Figure 4:
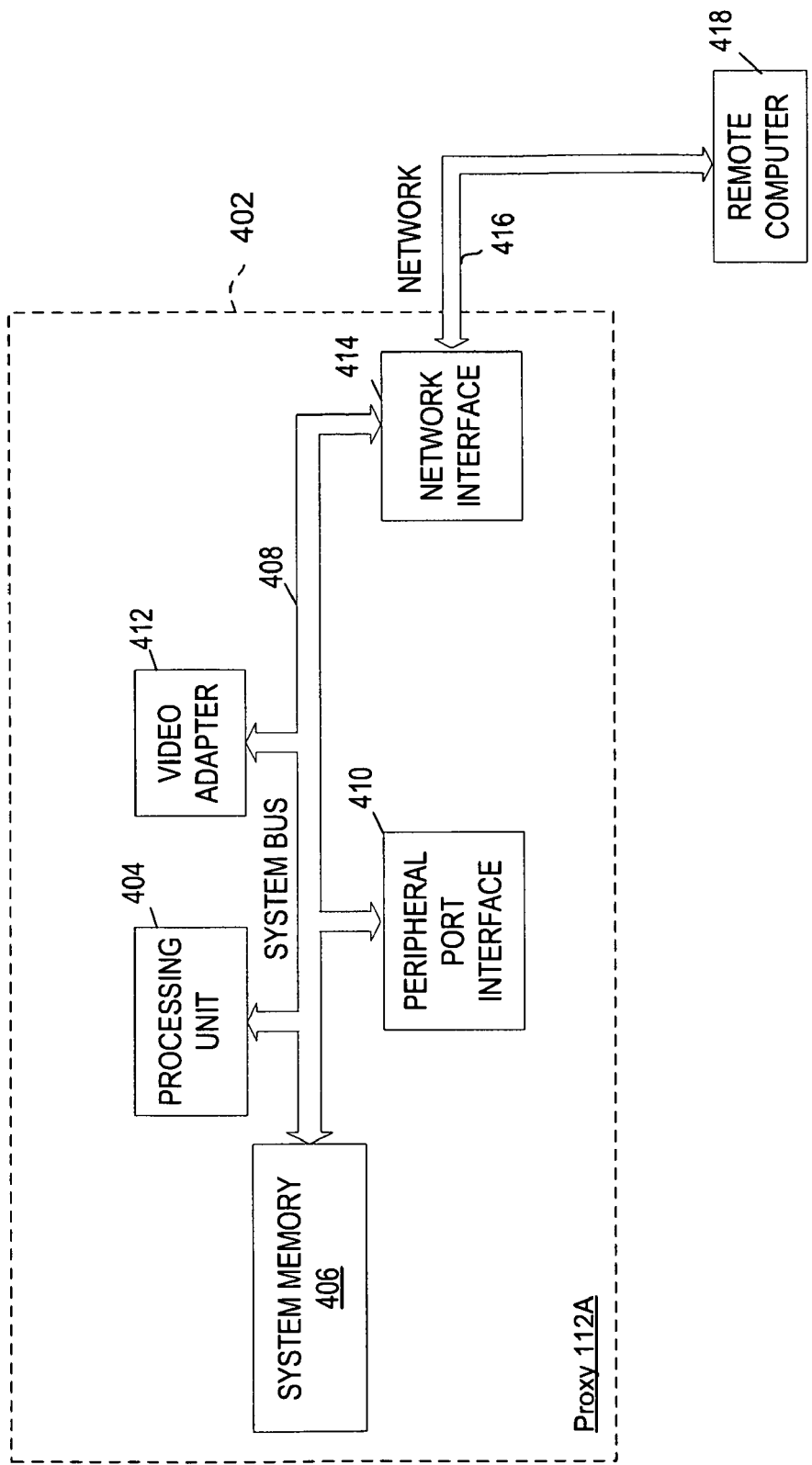
FIG. 4 illustrates one possible environment in which the systems and methods described herein may be employed, according to certain embodiments.

FIG. 4 illustrates one operating environment 400 in which the various systems, methods, and data structures described herein may be implemented. The illustrative operating environment 400 of FIG. 4 includes a general purpose computing device in the form of a computer 402, including a processing unit 404, a system memory 406 a peripheral port interface 410, and/or a video adapter 412, and a system bus 408 that operatively couples various system components.

There may be one or more processing unit 404, such that the processor of computer 402 comprises a single central-processing unit (CPU), or a plurality of processing units (i.e., a parallel processing environment.) The computer 402 may be a conventional computer, a distributed computer, or any other type of computer. Therefore, the local proxy 112A may be implemented on the computer 402. More specifically, the methods described herein for using a local proxy in an instant messaging system may be implemented using computer-readable instructions, which can be stored in the system memory 406. The computer-readable instructions may be executed by the processing unit 404 to implement the method 300 described herein.

The computer 402 may use a network interface 414 to operate in a networked environment by connecting via a network 416 to one or more remote computers, such as remote computer 418. The network 416 may be used to send one or more IMs between devices 102A-F. The remote computer 418 may be another computer, a server, a router, a network PC, a client, a peer device or other common network node, and typically includes many or all of the components described above relative to the computer 402. The types of networks 416 depicted in FIG. 4 include the Internet, a local-area network (LAN), and a wide-area network, among others. Such networking environments are commonplace in office networks, enterprise-wide computer networks, intranets and the Internal, which are all types of networks. In a networked environment, the various systems, methods, and data structures described herein, or portions thereof, may be implemented, stored and/or executed on the remote computer 418. It is appreciated that the network connections shown are illustrative and other means of and communications devices for establishing a communications link between the computers may be used.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
   receiving an instant message (IM) from a first device, the IM addressed to a second device, the first device capable of communicating with a proxy;

determining whether the second device is local to the proxy;
storing the IM received from the first device in a message cache in response to determining that the second device is local to the proxy;
determining a dynamic weight associated with the IM based on a weighting scheme;
determining whether the dynamic weight associated with the IM satisfies a pre-determined threshold value;
in response to determining that the dynamic weight associated with the IM satisfies the pre-determined threshold, determining a length of time to store the IM in the message cache based at least in part on the dynamic weight;
in response to determining that the second device is available to receive the IM, sending the IM from the message cache to the second device and removing the IM from the message cache;
determining, using the weighting scheme, an additional dynamic weight associated with each of additional IMs stored in the message cache;
prioritizing the additional IMs stored in the message cache based on the additional dynamic weight associated with each of the additional IMs; and
determining the length of time to store each of the additional IMs based on the prioritized additional IMs stored in the message cache.

2. The method of claim 1, further comprising:
the first device sending the IM to the second device prior to said receiving.

3. The method of claim 1, wherein said receiving the IM from the first device comprises the proxy receiving the IM.

4. The method of claim 3, further comprising:
the proxy sending the IM to a central server if the second device is determined not to be local to the proxy.

5. The method of claim 1, wherein the weighting scheme comprises weighting one or more of:
a number of times the second device has communicated with the proxy within a particular period of time;
an amount of time elapsed since the second device has communicated with the proxy;
a number of times the second device has communicated with the proxy;
whether the first device and the second device are on a list of preferred connections; and
conditions of a network connecting one or more of the first device, the second device, the proxy, and a central server.

6. The method of claim 5, further comprising:
changing the weighting scheme from a first weighting scheme to a second weighting scheme.

7. The method of claim 1, further comprising:
determining the length of time to store the IM in the message cache based at least in part on a number of times the second device has previously communicated with the proxy to receive or transmit other IMs.

8. The method of claim 1, wherein storing the IM in the message cache comprises:
storing the IM for a pre-determined amount of time; and
modifying the pre-determined amount of time based on a number of times the second device has communicated with the proxy.

9. The method of clam 1, further comprising:
in response to determining that the length of time that the IM has been stored in the message cache satisfies a second pre-determined threshold, sending the IM to a central server; and
removing the IM from the message cache.

10. A computer-readable storage device storing instructions executable by one or more processors to perform acts comprising:
receiving an instant message (IM) from a first mobile device by a proxy, the IM addressed to a second mobile device;
determining whether the second mobile device is local to the proxy;
storing the IM received from the first device in a message cache in response to determining that the second device is local to the proxy;
dynamically determining a dynamic weight for the IM using a weighting scheme in response to determining that the second mobile device is capable of communicating with the proxy;
in response to determining that the dynamic weight satisfies a threshold, determining a length of time to store the IM in the message cache based at least in part on the dynamic weight; and
in response to determining that the second mobile device is available to receive the IM, sending the IM to the second mobile device when the IM is stored in the message cache and removing the IM from the message cache;
determining, using the weighting scheme, an additional dynamic weight associated with each of additional IMs stored in the message cache;
prioritizing the additional IMs stored in the message cache based on the additional dynamic weight associated with each of the additional IMs; and
determining the length of time to store each of the additional IMs based on the prioritized additional IMs stored in the message cache.

11. The computer-readable storage device of claim 10, the acts further comprising:
sending the IM from the proxy to a central server for storage when the dynamic weight does not satisfy the threshold.

12. The computer-readable storage device of claim 10, wherein the weighting scheme includes weighting a number of times the second mobile device has communicated with the proxy within a particular period of time.

13. The computer-readable storage device of claim 10, wherein the weighting scheme includes weighting a number of times the second mobile device has previously communicated with the proxy.

14. The computer-readable storage device of claim 10, wherein said dynamically determining the dynamic weight using the weighting scheme comprises using one or more of:
a number of times the second mobile device has recently communicated with the proxy;
the amount of time elapsed since the second mobile device has communicated with the proxy;
a number of times the second mobile device has communicated with the proxy over a lifetime of the second device;
whether the first mobile device and the second mobile device are on a list of preferred connections; or
conditions of a network connecting one or more of the first mobile device, the second mobile device, the proxy, and a central server.

15. A system comprising:
a proxy communicatively coupled to a central server and to a first device and a second device, the proxy separate from the central server and from the first device and the second device, the proxy comprising:

a transmission module configured to receive an instant message (IM) from the first device, the IM addressed to the second device;
a message cache controller communicatively coupled to the transmission module, the message cache controller configured to determine whether to store the IM;
a message cache communicatively coupled to the message cache controller, the message cache configured to:
 determine a dynamic weight associated with the IM based on a weighting scheme;
 determine whether the dynamic weight associated with the IM satisfies a pre-determined threshold value;
 in response to determining that the dynamic weight associated with the IM satisfies the pre-determined threshold, determine a length of time to store the IM in the message cache based at least in part on the dynamic weight; and
 store the IM in response to the message cache controller determining that the second device is local to the proxy;
 determine, using the weighting scheme, an additional dynamic weight associated with each of additional IMs stored in the message cache;
 prioritizing the additional IMs stored in the message cache based on the additional dynamic weight associated with each of the additional IMs; and
 determining the length of time to store each of the additional IMs based on the prioritized additional IMs stored in the message cache; and
a message forwarding module configured to:
 when the IM is stored in the message cache, forward the IM from the message cache to the central server after a pre-determined period of time elapses; and
 forward the IM from the message cache to the central server in response to determining that the second device is not local to the proxy.

16. The system of claim 15, wherein the message cache controller determines to store the IM using a dynamic weighting scheme, wherein the dynamic weighting scheme is based on a number of times the second mobile device has connected to the proxy to receive or transmit other Ns within a particular period of time.

17. The system of claim 15, wherein the message cache controller determines to store the IM based on a dynamic weighting scheme that weights:
 a number of times the second mobile device has recently communicated with the proxy;
 an amount of time elapsed since the second mobile device has communicated with the proxy;
 a number of times the second mobile device has communicated with the proxy over a lifetime of the second device;
 whether the first mobile device and the second mobile device are on a list of preferred connections; and
 conditions of a network connecting one or more of the first mobile device, the second mobile device, the proxy, and the central server.

18. The system of clam 15, wherein the message cache controller determines a timeout value for a duration for locally storing the IM in the message cache;
 wherein the timeout value is based on a number of times the second mobile device has previously communicated with the proxy.

19. The system of claim 15, wherein the message cache controller is configured to determine a dynamic weighting scheme and to determine whether to store the IM in the message cache based on the dynamic weighting scheme;
 wherein the message cache controller adjusts the dynamic weighting scheme based on a number of times the second device has communicated with the proxy.

* * * * *